UNITED STATES PATENT OFFICE.

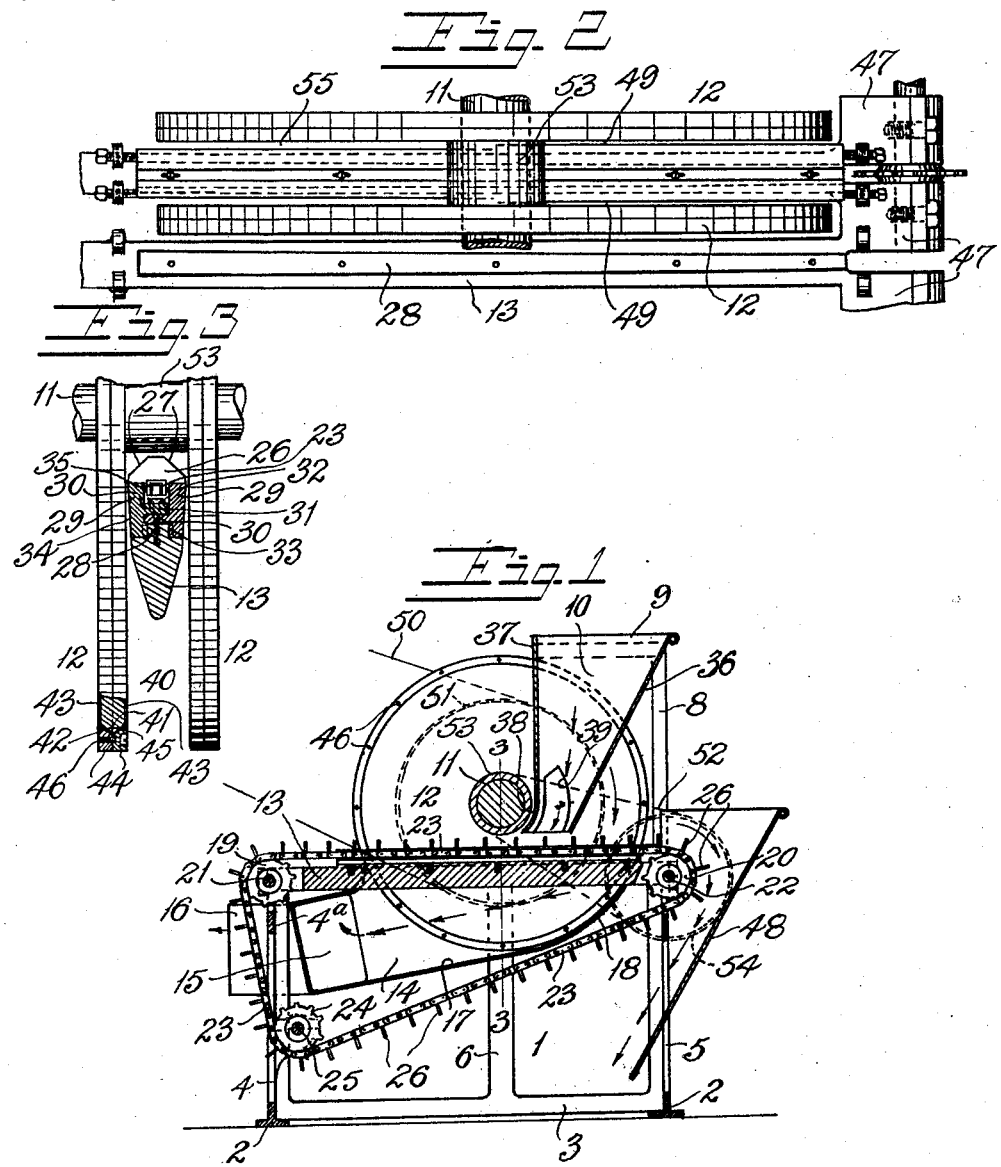

JAMES C. GARNER, OF HOUSTON, TEXAS, ASSIGNOR, BY MESNE ASSIGNMENTS, TO THE GARNER GIN COMPANY, INC., OF HOUSTON, TEXAS, A CORPORATION OF TEXAS.

SEED CLEANER.

1,406,636.  Specification of Letters Patent.  Patented Feb. 14, 1922.

Application filed February 3, 1920. Serial No. 355,933.

*To all whom it may concern:*

Be it known that I, JAMES C. GARNER, a citizen of the United States, residing at Houston, in the county of Harris and State of Texas, have invented certain new and useful Improvements in Seed Cleaners, of which the following is a specification, reference being had therein to the accompanying drawing.

This invention relates to improvements in mechanisms for making smooth the surfaces of seeds of the sorts which are apt to have fuzzy or filamentary growths adhering to them. For example, mention can be made of cotton seeds, which, after being subjected to the action of the gin, still have more or less of a minute fibrous or fuzzy growth attached to them. It is desirable to thoroughly cleanse or polish them, particularly when the seed is to be used for planting.

Fig. 1 is a vertical transverse section of the machine.

Fig. 2, is a plan view of part of the mechanism.

Fig. 3 is a view showing some of the parts in elevation and others in vertical section on the plane of line 3, 3 of Fig. 1.

1 indicates a main frame. It is shown as having sills 2, running lengthwise of the machine; cross girts 3; front uprights 4; rear uprights 5, and center uprights 6. The framework is as long as is required for the capacity of the machine. Upward from the lower or main part of the frame there extends a supplemental frame having a suitable number of uprights 8 and horizontal bars 9, these serving to support the cotton feed ducts 10.

At the ends of the frame are bearings for supporting a shaft 11.

At intervals along this shaft are positioned disks 12, 12; and of these also there are as many as desired for capacity. In the space between each disk and the next are positioned the devices for supplying the material and the devices for moving them while being acted upon. In each space (between two of the disks) there is a bar 13 extending from the front upright parts 4, 4ª of the frame to the rear uprights at 5.

In the space below the horizontal planes of the bars 13 there is arranged a box or casing 14 adapted to collect streams of air, moving downward on the vertical lines adjacent to the disks. These streams enter a common duct 15 at the front of the box or chamber 14 and finally pass out from that part of the duct which is indicated at 16 which is connected to any suitable air exhausting device. This air box is preferably made of sheet metal, the bottom being inclined as shown at 17, and the rear part at 18 being curved upward and secured to the bars 13 so as to form an air tight connection and prevent the entrance of air on horizontal lines from points behind the frame or machine.

The disks 12 extend down into the air chamber 14, and, as will be described below, reduced currents of air can move downward along lines closely adjacent to the faces of the disks and into this chamber.

19 is a sprocket wheel in front and 20 a sprocket wheel at the rear of the disk. There is one of each of these wheels 19, 20, positioned on the central transverse lines of the compartment between each disk and the next, and at the ends of the a bar 13. The wheel 19 is on a shaft 21 and the wheel 20 on a shaft 22. These shafts can extend the length of the machine on axes parallel to the axis of the shaft 11. 23 is a sprocket chain engaging with the wheels 19 and 20, and also with a tightening idler 24 on a shaft 25 in the lower part of the framework. 26, 26 are flights carried by the chain links, they being tapered at their side edges as at 27. The chain links are narrower than the flights and connected to them at the centers so that the flights project laterally beyond the chain at each of its sides. The bar 13 is formed with a rib or tongue 28 extending longitudinally along its upper face. Between this bar and the chain there is interposed a supporting device which consists of two parallel bars 29. Each has an inwardly projecting rib or flange 30 adjacent to and overlapping the flange upon the other. These two bars 29 are secured together and to the lower bar 13, but by devices which permit lateral adjustment. There are transverse slots 31 in the flanges 30, and through these pass screws 32. The bars 29 provide a groove or passage at 33 for the rib 28 on the upper surface of bar 13. When the screws 33 are loosened the bars 29 can be adjusted closer to or farther from the faces of the disk 12, as required.

The outer surface 34 of each bar is inclined slightly from the vertical, this permitting the upper outer corner to be brought close to a disk.

When the bars 29 are fastened in position they provide a groove or passage at 35 along which the chain 23 can move, the flights 27, 26 resting on the top edges of the bars 29.

The cotton seed is supplied through the guide at 10 as noted, this having an inclined back wall 36 which tends to deliver the seed at points near the vertical lines of the central part of the disk. The front wall 37 of the hopper or guide is in vertical lines close to the shaft 11, and at its lower edge is preferably curved forward somewhat as shown at 38. The side walls of the chute are cut away, as shown at 39, in order to permit the seeds at the lower end of the chute to move or press laterally toward the disks.

The face of each disk is provided with abrading material of such grade, as to fineness of particles, as to meet conditions. As shown, I form the main part 40 of each disk 12 with the beveled periphery 41, the inclined faces 42 being equal and meeting at the central transverse plane. 43, 43 indicate annular sheets or disks of emery cloth or carborundum cloth of diameter such as to cover the face of the disk 12 and also more or less of one of the bevel faces 42. 44, 44 are rings, each of approximately one-half of the thickness of the disk, and each with a chamfered or beveled surface at 45. 46, 46 are screws or bolts adapted to draw toward each other the rings or half rings 44, 44. These screws engage with one of the rings by threads, their heads abutting laterally against the other. When they are forced together their beveled surfaces 45 engage the edge parts 46 of the emery disks and clamp them tightly in place. The collars 53 which hold each disk 12 at predetermined distances from its neighbors are also utilized to clamp the inner edge parts of the sheets of cloth to the disks at points around the shaft 11.

If desired, the carborundum cloth or its equivalent may be secured to the disks by any suitable adhesive. In such case it will not be necessary to have the outer clamping rings 44 unless they are desired for further securing the sheets of material to the face of the disks.

The box or casing 14 for the air which is drawn downward and outward may be long enough to receive, in one chamber, the bottom parts of all of the disks 12. The duct at 16 may be connected with a suction fan, or other draft causing means, and it will be seen that, when in action, the air will be drawn primarily downward on vertical lines between the surfaces of each disk and the next adjacent supporting bars 13.

It will be understood that the main framework can be extended longitudinally to meet requirements, and the builder will supply such detail parts at the ends and at other places as are found necessary.

The shaft 11 extends longitudinally of, and, preferably, from end to end of the machine, it being held in suitable bearings as aforesaid. It carries a belt wheel 51 with which engages the belt 50, actuated by any suitable prime driver.

The system of sprocket wheels 19, 20, 24 and conveyor chains 23, are actuated by the shaft 22 which also extends longitudinally of the machine. It is provided with a belt wheel 54 with which engages a belt 52 driven by a suitable pulley on the shaft 11. A variable-speed driver, of any of the well known forms can be substituted for the simple form of driver referred to, that is, the belt 52, wheel 54 and driving pulley; as under some circumstances it may be desirable to vary the relative speeds of the seed dragging flights 26, in relation to the angular speed of the disks 12. Some seed may require a longer delinting and abrading action than others; and in such cases the speed of the chain conveyors should be relatively reduced.

The method of operation of a mechanism having parts such as above described will be readily understood.

The cotton seeds passing through each feed duct 10 are deposited upon the devices 34 supported by the bar 23, preferably at points in vertical lines slightly to the rear of the vertical axial plane of the disks. The seeds, after settling on the conveyor and its support, are induced to move laterally from the central vertical plane, longitudinally of the conveyor, toward the surfaces of the neighboring disks, by the agencies above referred to, that is; the pressure of the column of seeds acts to force those at the bottom of the column laterally through the openings 39 in the side walls of the duct 10; the upward projecting central part of each flight 26, with tapered side edges, acts to similarly move the seeds respectively toward the disks; and as they respectively come into the regions of influence of the air currents which move downward along the faces of the disks and through the throats 49, the seeds are sucked into the angles between the disks and the edges of the bars 34. In settling thus laterally and downward, they reach the vertical planes of the narrow slots or throatways 49, as aforesaid, and here part of the surface of each seed comes into contact with the active surface of the abrading device, to wit, the carborundum cloth.

The disks and the conveyors being in normal action, each seed is immediately engaged by a flight 26, and is dragged rearward along the mouth of a throatway 49.

While moving along the path described the abrading surface of the rotating disks catches the lint fibers or fuzzy particles that may be adhering to the seeds, tears them off and carries them down through the slot 49 and into the air chamber or box 14. And at the same time the movement of the disk causes the seeds to rotate around their own centers, and all parts of their surfaces, respectively, are brought to positions where the abrading surface can act in the way described. The parts are so related and the speeds are so regulated, that by the time a seed passes across the abrading surface, that is, from the center of the disk to its periphery along the lines of the conveyor, it has been thus rotated again and again, sufficiently to have all of the adhering lint or fibers detached and to have its shell slightly abraded, enough to insure its being perfectly cleaned and smooth.

As the air slots 49 are relatively narrow, the seeds cannot be wedged into them, or positioned so as to clog them, but will be carried, as described, along the active surface of the abrading disk, and under the described action of the air will tend to remain constantly in contact therewith. If a seed should be temporarily forced away from the disk, it will be immediately drawn back by the air currents moving through slots 49.

The foreign particles which are loosened or torn off from the seeds by the abrading surface of the disk are carried by the air downward through the slots 49 into the box 14, and from this they are taken to a collecting mechanism.

If any particles adhere to the face of a disk the air currents will act to remove them, while they are passing through the box 14. And such particles are collected with the others just referred to.

If any particles tend to adhere strongly to the disk and move upward from the box they meet stronger currents of air which are moving downward through the slots or throats at 55; these being wider than those at 49, and positioned in front of the axis of the disks and adjacent their faces, and insuring a thorough stripping of fibers from the faces of the disks.

The seeds, after they have been acted on in the way described, are delivered, cleaned of fiber and with smooth and polished shells, to the hopper or chute 48. After they leave the guideways or slots 49 they may be received upon any suitable support, such as aprons 47, and be advanced over these to the hopper.

The seeds obtained from the machine are in superior condition either for treatment at the mills or other places where cotton seed are used in manufactures, or for planting.

As is well known, the planting of cotton seed has been carried on with difficulty and expense because of the short lint fibers permanently adhering to them. When they are placed in the receptacles in cotton planters, they form mats or wads and no method has been found to effectually segregate them, one from another, to permit them to be planted separately or with accuracy. Hence cotton is commonly planted in drills in more or less continuous rows, and after the plants are partially grown the labor and expense incident to "chopping out" large numbers of the plants are necessary. But when the seed are prepared in the way here described, they can be handled with as much ease and accuracy as can the kernels of corn or other grains when being planted. They accurately fit the apertures in the seeder plates and can be automatically counted out in the desired numbers, and dropped with regularity.

I am aware that it has been heretofore proposed to use rotary disks in various ways in the ginning of cotton, that is, for the initial treatment of the cotton while its seeds are still carrying the long fibers. In the machines so proposed it has been suggested to use metallic teeth of relatively large size and so related to the other devices that the teeth will become charged with fibers caught thereon, and to then remove these fibers from the teeth by air currents. The present mechanism is intended for treating the seeds that have been delivered from machines of the earlier sorts referred to. Those that are delivered therefrom, as well as the seeds delivered from the ordinary saw gins, (although they may have had the marketable lint filaments removed to the maximum) still have their surfaces in such condition that they are not available for either of several purposes, particularly for successfully handling in planting mechanisms. I accomplish the end at which I aim by subjecting the seeds to the action of devices which yieldingly hold them against a finely grained abrading and polishing surface and simultaneously and instantly carry away the particles which are released by the abrasion, while the seeds are caused to roll upon themselves, and to simultaneously acting devices which positively move them across the surface which effects the polishing or abrading. The object is not to load a number of teeth with fibers under the general conception of securing the cotton lint. Here the purpose is to put the seed into a predetermined condition, regardless of the lint, which is treated as negligible.

What I claim is:

1. The combination of the two adjacent disks, the endless carrier traveling rectilineally between the disks and across their faces, means for forming variable narrow air passages between the carrier and the disks, the carrier being provided with seed engaging devices, means for feeding the seed to points between the disks, the air chamber below the carrier, and means for causing air to move downward through the said passages and said chamber.

2. The combination of the two adjacent disks, the support positioned between the disks, the air-guiding means carried by the support and laterally adjustable towards and from the disks, an endless carrier chain on the support traveling across the faces of the disks, the chain and air-guiding means being arranged to furnish a substantially flat seed supporting surface, and said chain having traveling seed engaging flights, means for feeding the seed to points between the disks and delivering them upon the said flat surface, the air chamber below the support, and means for drawing the air past the air-guiding devices and through the said chamber.

3. The combination of the two adjacent disks, the support positioned between the disks and having its edges adjustable relatively to the faces of the disks to provide variable air passages, the endless carrier chain on the support having its active leg arranged to move between the disks and across their faces and having its return leg positioned below the active leg, the air chamber below the support, means for feeding seed to points between the disks and deliver them to the carrier, and means for exhausting air downward along the edges of the support.

4. In a machine for cleaning and polishing linty seeds after ginning, the combination with means for supplying the seeds, of means acting to roll the seeds upon themselves respectively and having a substantially continuous fine grained, abrading and polishing surface to contact with the surfaces of the seeds, simultaneously acting means for causing the seeds to be positively but yieldingly forced against said abrading and polishing surface and for instantly carrying away the particles loosened from the surfaces of the seeds, and simultaneously acting devices for positively moving the seeds across the said abrading surface while they are being forced against it as aforesaid.

5. In a machine for cleaning and polishing linty seeds after ginning, the combination with means for supplying the seeds indiscriminately, of means acting to roll each seed upon itself and abrade and polish its surface, means simultaneously acting to cause air to positively but yieldingly hold the seed against the abrading and cleaning surface and instantly carry away the particles loosened from its surface, and devices for simultaneously moving the seed positively across the said abrading surface while being acted on by the air.

In testimony whereof I affix my signature.

JAMES C. GARNER.